(12) United States Patent
Tollefson (10) Patent No.: US 11,750,277 B2
(45) Date of Patent: Sep. 5, 2023

(54) APPLICATION OF MACHINE LEARNING TO MUOS NETWORK MANAGEMENT (71) Applicant: Rockwell Collins, Inc., Cedar Rapids, IA (US)

(72) Inventor: William T. A. Tollefson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 306 days.

(21) Appl. No.: 17/244,070

(22) Filed: Apr. 29, 2021

(65) Prior Publication Data
US 2022/0352978 A1 Nov. 3, 2022

(51) Int. Cl.
*H04B 7/185* (2006.01)
*G06N 20/00* (2019.01)
*H04W 64/00* (2009.01)
*H04B 7/005* (2006.01)
*H04W 74/00* (2009.01)
*G06F 18/214* (2023.01)

(52) U.S. Cl.
CPC ..... *H04B 7/18534* (2013.01); *G06F 18/2148* (2023.01); *G06N 20/00* (2019.01); *H04B 7/005* (2013.01); *H04W 64/006* (2013.01); *H04W 74/002* (2013.01)

(58) Field of Classification Search
CPC . H04B 7/18534; H04B 7/005; G06F 18/2148; G06N 20/00; H04W 64/006; H04W 74/002; H04W 52/146; H04W 52/0258; H04W 24/00; H04W 84/06; H04W 88/04
See application file for complete search history.

(56) References Cited

U.S. PATENT DOCUMENTS

| | | | | |
|---|---|---|---|---|
| 4,999,833 A | * | 3/1991 | Lee | H04W 4/12 370/428 |
| 9,942,817 B1 | * | 4/2018 | Thommana | H04B 7/18513 |
| 9,973,406 B2 | * | 5/2018 | Gorman | H04L 41/22 |
| 10,686,687 B2 | * | 6/2020 | Matthews | H04W 4/38 |
| 2018/0212837 A1 | * | 7/2018 | Kalluri | G06N 20/10 |
| 2019/0394272 A1 | * | 12/2019 | Tamborski | H04L 67/141 |
| 2020/0245210 A1 | * | 7/2020 | Fotheringham | H04W 36/14 |
| 2020/0364583 A1 | * | 11/2020 | Pedersen | G06N 5/02 |

FOREIGN PATENT DOCUMENTS

| | | |
|---|---|---|
| CN | 110012516 B | 10/2020 |
| CN | 111770544 A | 10/2020 |
| KR | 102124166 B1 | 6/2020 |
| WO | 2020183182 A1 | 9/2020 |

\* cited by examiner

*Primary Examiner* — Ankur Jain
(74) *Attorney, Agent, or Firm* — Suiter Swantz pc llo (57) ABSTRACT

A system for satellite communication is disclosed. The system includes a base terminal and a mobile terminal configured to communicate via a communication satellite relay. The base terminal and the mobile terminal include a receiver and a transmitter. At least one of the base terminal or the mobile terminal further includes an artificial intelligence engine configured to receive status or instruction data based on a received signal, determine an instruction or command based on the received data, prepare instruction data or updated status data, and send an instruction signal or status signal based on the instruction data or updated status data. The artificial intelligence engine utilizes a machine learning model and may generate the machine learning model.

15 Claims, 9 Drawing Sheets

APPLICATION OF MACHINE LEARNING TO MUOS NETWORK MANAGEMENT

BACKGROUND

The Mobile User Objective System (MUOS) is a military communications satellite system, typically operating in the ultra-high frequency (UHF) band. In comparison to previous military satellite systems, MUOS provides increased communications capabilities to more modern, smaller terminals (e.g., MUOS functional terminals (MFT)) while still supporting interoperability with legacy terminals. Particularly, MUOS is designed to support users who require greater mobility, higher bit rates and improved operational availability.

MUOS includes the aforementioned satellites and MFTs, as well as base stations (ground transport segments (GTS)). The GTS monitors the status of MUOS and informs the MFTs of changes within the system, such as power fluctuations or cell coverage modifications. The MFT may then make changes in response to the information received by the GTS. Conversely, the MFT may report changes of mobility, cell configuration, or other characteristics to the GTS. Careful coordination of the satellite, MFT, and GTS is required for competent communication. However, the ability of MUOS to adjust to changes within the system and/or the system environment may be limited to the reaction of detected changes as they occur, with little ability to anticipate or predict changes in the system or the environment. Therefore, it is desirable to provide a solution that improves MUOS responsiveness and connectivity than conventional approaches.

SUMMARY

A communication system is disclosed. In one or more embodiments, the communication system includes a mobile terminal. In one or more embodiments, the mobile terminal includes a mobile transmitter. In one or more embodiments, the mobile terminal includes a mobile receiver. In one or more embodiments, the communication system includes a base terminal. In one or more embodiments, the base terminal includes a radio base station. In one or more embodiments, the radio base station includes a base receiver configured to receive the status signal from the mobile terminal. In one or more embodiments, the radio base station includes a link maintenance module configured to convert the status signal into status data and convert instruction data into an instruction signal. In one or more embodiments, the radio base station further includes a base transmitter configured to transmit an instruction signal to the mobile terminal. In one or embodiments, the communication system includes a radio network controller configured to transmit an instruction signal to the mobile terminal. In one or more embodiments, the radio network controller includes one or more processors. In one or more embodiments, the radio network controller further includes a memory coupled to the one or more processors and having instructions stored upon. In one or more embodiments, the base terminal further includes a base artificial intelligence engine in communication with the one or more processors and the memory. In one or more embodiments the base artificial intelligence engine is configured to receive the status data. In one or more embodiments, the base artificial intelligence system is configured to determine an instruction based on the status data. In one or more embodiments, the base artificial intelligence system is configured to prepare the instruction data. In one or more embodiments, the base artificial intelligence system is configured to send the instruction data to the link maintenance module.

In some embodiments of the communication system, the base artificial intelligence engine is further configured to apply a machine learning model to analyze the status data.

In some embodiments of the communication system, the base artificial intelligence engine is further configured to generate the machine learning model. In some embodiments, generating the machine learning model includes collecting the status data. In some embodiments, generating the machine learning model further includes processing the status data. In some embodiments, generating the machine learning model further includes developing the machine learning model via the processed data. In some embodiments, generating the machine learning model further includes training the machine learning model. In some embodiments, generating the machine learning model further includes evaluating the machine model. In some embodiments, generating the machine learning model further includes tuning one or more parameters of the machine learning model.

In some embodiments of the communication system, at least one of the mobile terminal or the base terminal is configured to communicate with a satellite.

In some embodiments of the communication system, the satellite is configured as a Mobile User Objective System (MUOS) satellite.

In some embodiments of the communication system, at least one of the status signal or the instruction signal is relayed via the satellite.

In some embodiments of the communication system, the communication system further comprises a disengagement control configured to disengage the artificial intelligence engine.

Another communication system is also disclosed. In one or more embodiments, the communication system includes a base terminal. In one or more embodiments, the base terminal includes a base receiver. In one or more embodiments, the base terminal further includes a base transmitter. In one or more embodiments, the communication system further includes a mobile terminal. In one or more embodiments, the mobile terminal includes a mobile receiver configured to receive an instruction signal from the base terminal. In one or more embodiments, the mobile receiver further includes one or more processors. In one or more embodiments, the mobile receiver further includes a memory coupled to the one or more processors and having instructions stored upon. In one or more embodiments, the communication system includes a mobile artificial intelligence engine in communication with the one or more processors and the memory. In one or more embodiments, the mobile artificial intelligence engine is configured to receive instruction data based on the instruction signal. In one or more embodiments, the mobile artificial intelligence system is configured to receive status data. In one or more embodiments of the disclosure, the mobile artificial intelligence engine is configured to determine a command based on the instruction data and the status data. In one or more embodiments of the disclosure, the mobile artificial intelligence engine is configured to update the status data based on the at least the command or a performance of the command. In one or more embodiments, the mobile receiver further includes a mobile transmitter configured to transmit a status signal to the base terminal based on the updated status data.

In some embodiments of the communication system, wherein the mobile artificial intelligence engine is further configured to apply a machine learning model to analyze the status data and the instruction data.

In some embodiments of the communication system, the mobile artificial intelligence engine is further configured to generate the machine learning model. In some embodiments, generating the machine learning model includes collecting at least one of the status data and the instruction data. In some embodiments, generating the machine learning model further includes processing at least one of the status data and the instruction data. In some embodiments, generating the machine learning model further includes developing the machine learning model via the processed data. In some embodiments, generating the machine learning model further includes training the machine learning model. In some embodiments, generating the machine learning model further includes evaluating the machine learning model. In some embodiments, generating the machine learning model further includes tuning one or more parameters of the machine learning model.

In some embodiments of the communication system at least one of the mobile terminal or the base terminal is configured to communicate with a satellite.

In some embodiments of the communication system the satellite is configured as a Mobile User Objective System (MUOS) satellite.

In some embodiments of the communication system at least one of the status signal or the instruction signal is relayed via the satellite.

In some embodiments of the communication system, the communication further includes a disengagement control configured to disengage the artificial intelligence engine.

In some embodiments of the communication system, the command includes at least one of adjusting a mobility threshold, triggering a mobility, adjusting data rates, or postpone a change in operational parameters.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 1A and 1s an illustration of a communication system configured to allow communication between two mobile terminals, in accordance with one or more embodiments of the disclosure;

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A satellite communication system is disclosed. Specifically, a satellite communication is disclosed that coordinates the communication of multiple user terminals to each other via messages relayed via a communication satellite. The operational changes in the user terminals are tracked by base stations, which coordinate operational conditions and connectivity between the user terminals and the communication satellite. Either the user terminal or the base station may include an artificial intelligence engine that utilizes machine learning. The artificial intelligence engine receives historical data and generates instructions for the modifications of operational parameters based on the historical data. The instructions may anticipate potential problems or performance issues within the satellite system, allowing the communication system to avoid connectivity and/or productivity issues.

FIGS. 1A-1D are illustrations of a communication system 100, in accordance with one or more embodiments of the disclosure. In some embodiments, the communication system 100 includes a communication satellite 104 configured to send and receive transmissions. The communication satellite 104 may be configured to send and receive any type of transmissions, such as electromagnetic transmissions. For example, the communication satellite 104 may be configured to send and/or receive electromagnetic transmissions that include but are not limited to UHF, Ka-Band, L-Band, C-band, X-band, Ku-band, microwave and VHF frequencies. The communication satellite 104 may configured as any type of artificial satellite configured within any type of satellite communication system. For example, the communication satellite 104 may be configured as a Mobile User Objective System satellite.

Figure 1A:
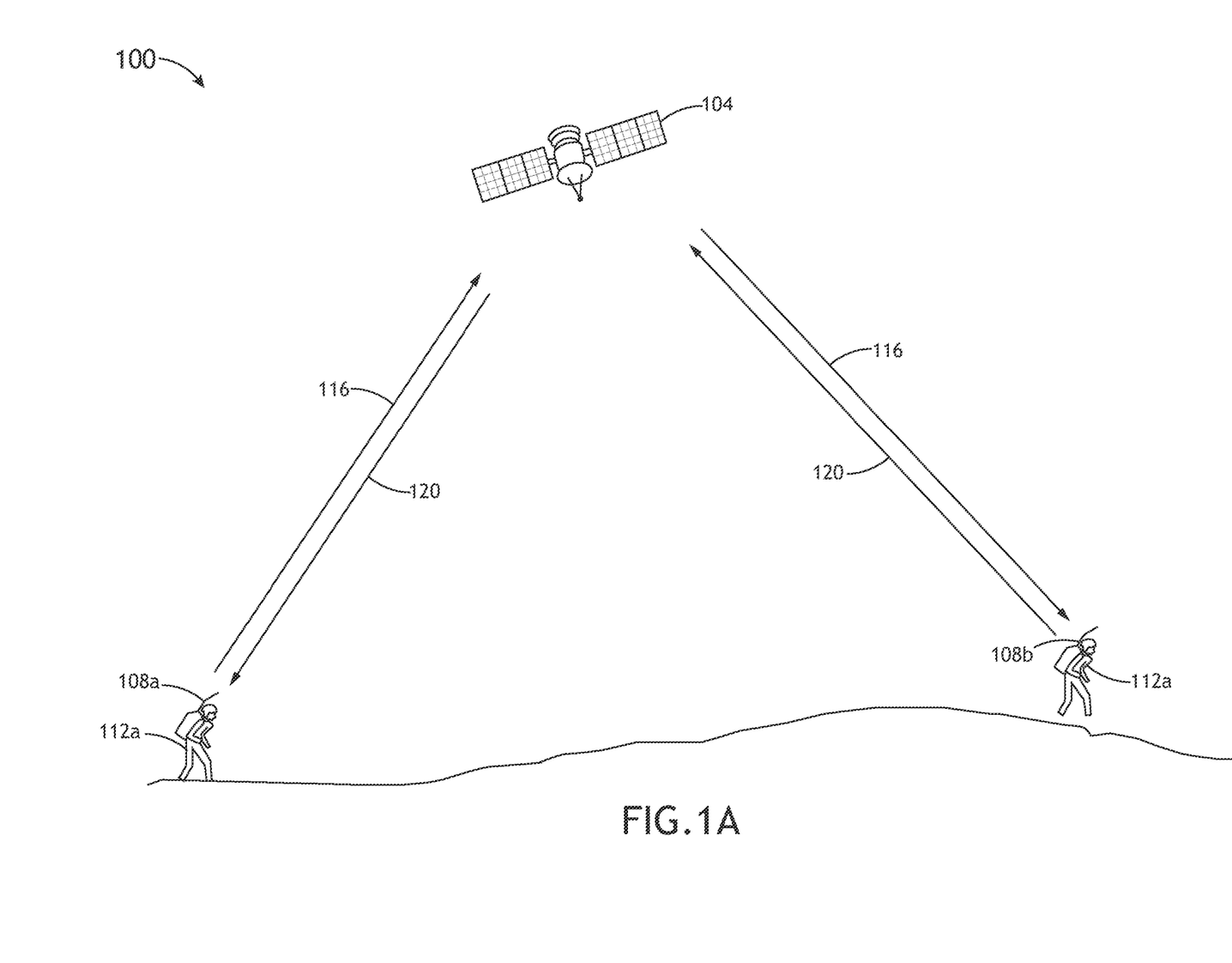

In some embodiments, the communication system 100 includes a mobile terminal 108a, 108b configured to send and/or receive messages that are relayed via the communication satellite 104. For example, a user 112a may send a first message 116 via the mobile terminal 108a to the communication satellite 104, which is then received by the mobile terminal 108b of another user 112b, who may then send a second message 120 that is relayed back to the first user 112a. The mobile terminal 108a, 108b may include any type of satellite radio. For example, the mobile terminal 108a, 108b may include a software defined radio including but not limited to a PRC-162 radio manufactured by Collins Aerospace. In another example, the mobile terminal 108a, 108b may include an aircraft radio including but not limited to an ARC-210 radio manufactured by Collins Aerospace. In another example, the mobile terminal 108a, 108b may include any satellite radio compatible with the MUOS waveform (e.g., the MFT) including but not limited to the aforementioned PRC-162 and ARC-219.

Figure 1B:
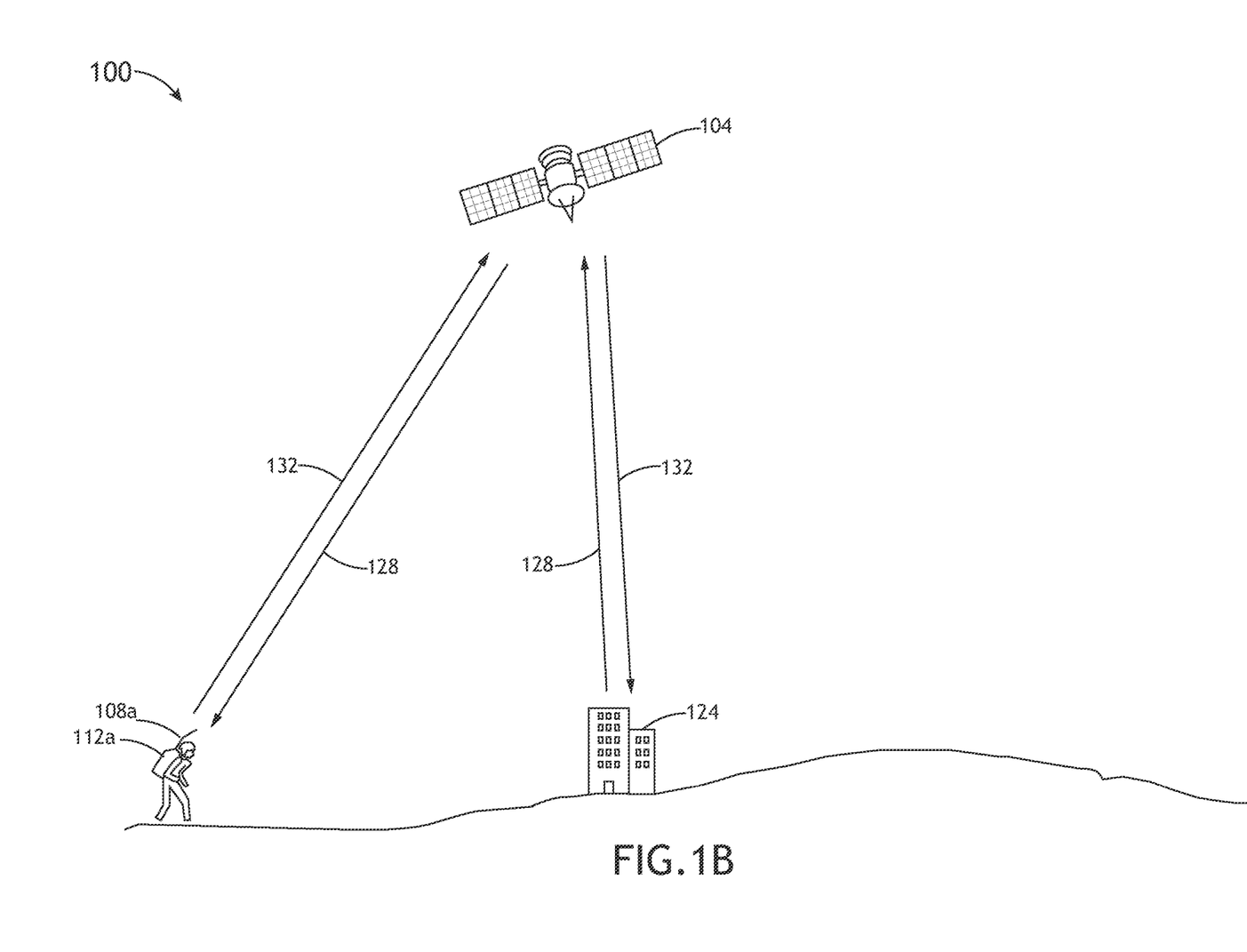
FIG. 1B is an illustration of a communication system configured to allow communication between a mobile terminal and a base station, in accordance with one or more embodiments of the disclosure.

In some embodiments, the communication system 100 further includes a base terminal 124 configured to communicate with the communication satellite 104 and/or the mobile terminal 108a, 108b via a relay with the communication satellite 104 (e.g., as shown in FIG. 1B). For example, the base terminal 124 may be configured to inform the mobile terminal 108a, 108b of a change is status of the communication system 100 that will require an operational change in the mobile terminal 108a, 108b to continue communications. For instance, the base terminal 124 may be configured to send an instruction signal 128 containing instruction data to the communication satellite 104, which relays the instruction signal to the mobile terminal 108a, 108b. Conversely, the base terminal 108a, 108b may be configured to send a status signal 132 containing status data to the communication satellite 104, which relays the status signal 132 to the base terminal 124.

Figure 1C:
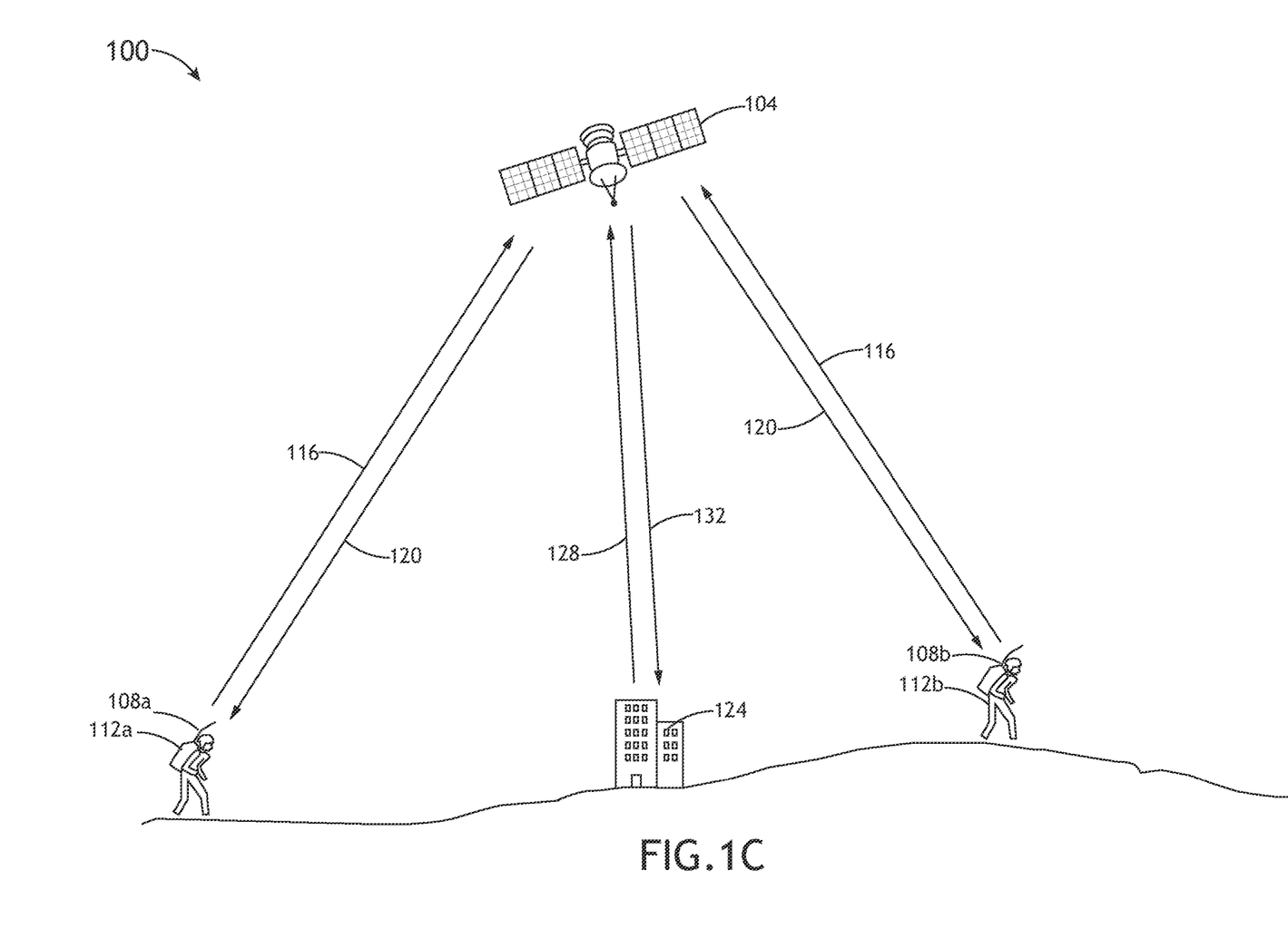
FIG. 1C is an illustration of a communication system configured to allow communication between two mobile terminals via base station, in accordance with one or more embodiments of the disclosure.

In some embodiments, the communication system 100 is configured to relay messages between mobile terminals 108a, 108b using both the communication satellite 104 and the base terminal 124 (e.g., as shown in FIG. 1C). For example, a user 112a may send a first message 116 via the mobile terminal 108a to the communication satellite 104. The communication satellite 104 then sends a status signal 128 to the base terminal 124 that is based on the first message 116. For example, the status signal 128 may contain both the data from the first message 116, and the and routing information for the one or more mobile terminals 108a, 108b. In another example, the status signal 128 contains the routing information for the one or more mobile terminals 108a, 108b, with some or all of the data of the first message stored within the communication satellite 104. The base terminal 124 then sends an instruction signal 128 to the communication satellite 104 instructing the communication satellite 104 to send the first message to the receiving mobile terminal 108b (e.g., the mobile terminal 108b that is registered with the base terminal 124). For example, the instruction signal 128 may contain both routing information and data from the first message 116 to the communication satellite 104. In another example, the instruction signal 128 contains routing information and further instruction to send data from the first message 116 stored on the communication satellite 104 to the receiving mobile terminal 108b. The communication satellite 104 then sends the first message 116 to the receiving mobile terminal 116b. The process is then reversed upon the sending and receiving of a second message 120 between mobile terminals 108a, 108b.

Figure 1D:
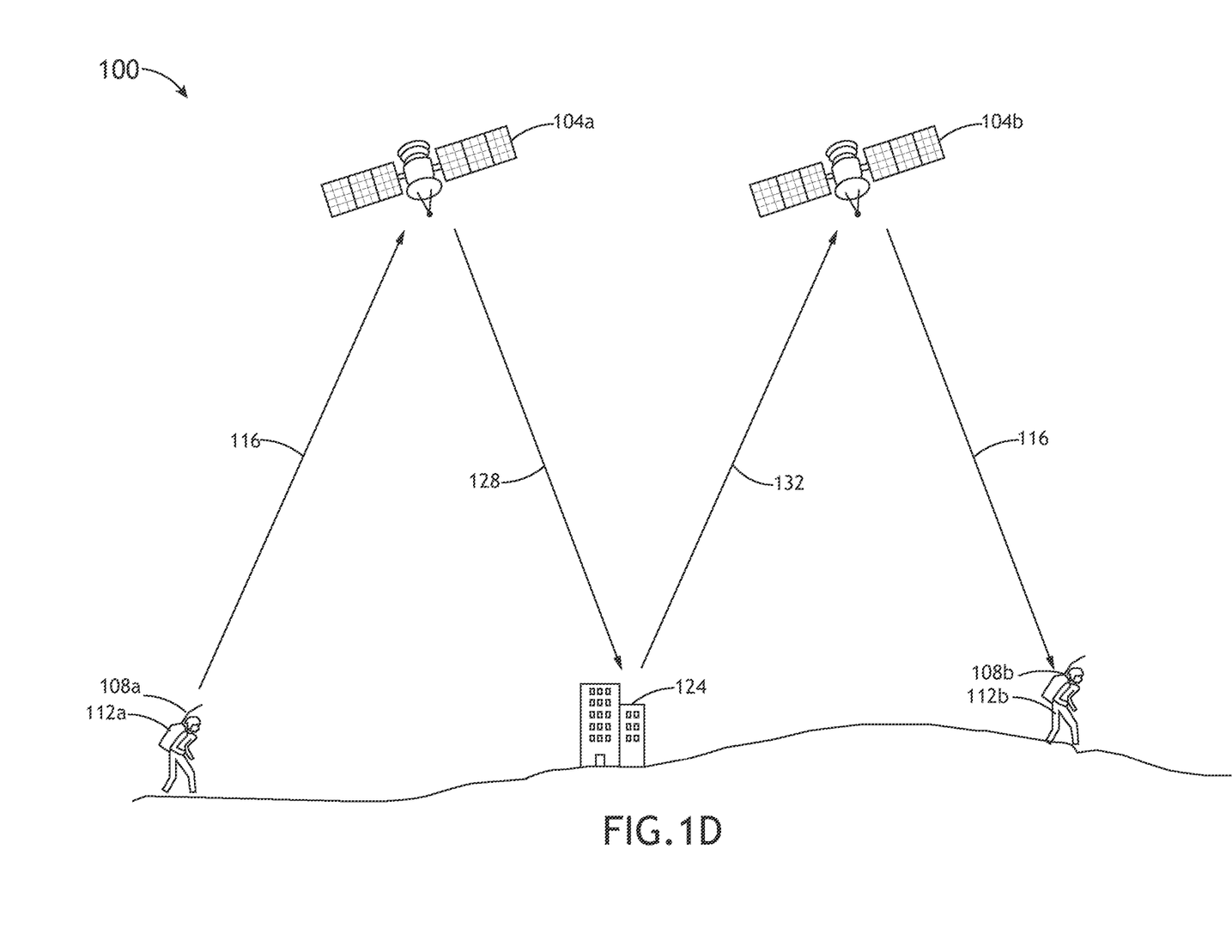
FIG. 1D is an illustration of a communication system configured to allow communication between two mobile terminals via base station and multiple communication satellites, in accordance with one or more embodiments of the disclosure.

In some embodiments, the communication system 100 is configured relay messages across multiple satellites 104a, 104b (e.g., as shown in FIG. 1D). For example, a mobile terminal 108a sending a first message 116 to another mobile terminal 108b would first send the first message 116 to the communication satellite 104a. The communication satellite 104 would then relay the status signal 132 containing the first message 116 to another communication satellite 104b, which would then relay the first message 116 to the receiving mobile terminal 108b. The process may then be reversed upon the sending of the second message 120 between the mobile terminals 108a, 108b. Each of the mobile terminals 108a, 108b may be registered to communication directly with one or more of the communication satellites 104a, 104b.

The communication system 100 may contain one or more of the communication satellite 104, the base terminal 124 and/or the mobile terminal 108a, 108b. For example, the communication system 100 may contain the mobile terminal 108a, 108b, and the base terminal 124, with the mobile terminal 108a, 108b and the base terminal 124 communicatively compatible with the communication satellite 104. In another example, the communication system 100 may contain the mobile terminal 108a, 108b, being communicatively compatible with the base terminal 124 and the communication satellite. In another example, the communication system includes the mobile terminal 108a, 108b, the base terminal 124, and the communication satellite 104.

The status signal 132 may contain any information regarding the status of the mobile terminal 108a, 108b, the base terminal 124, the communication satellite, or the communication system 100, and may contain data from the first message 116 or second message 120. For example, the status signal 132 may contain any information relating to the mobile terminal 108a, 108b including but not limited to uplink interference, position (e.g., geographical location), speed, velocity, cell configuration, transmit power, predicted stability of communication link, mobile threshold, data rate, predicted change in data rate, signal congestion, signal strength, predicted signal strength, jamming conditions, and predicted jamming conditions. For instance, for an aircraft utilizing a mobile terminal 108a, 108b, the status signal 132 may contain information relating to the velocity and position of the mobile terminal 108a, 108b and cell currently used for communication between the mobile terminal 108a, 108b and the communication satellite 104. In particular, the mobile terminal 108a, 108b may include within the status signal a predicted time that the mobile terminal 108a, 108b may move from one terminal to another. In another instance, a mobile terminal 108a for a user 112a (e.g., a ground troop) may send information within the status signal 132 detailing jamming conditions.

The instruction signal 128 may contain any information regarding the status of the base terminal 124, the mobile terminal 108a, 108b, the communication satellite 104, or the communication system 100, and may contain data from the first message 128 or second message 120. For example, the instruction signal 128 may contain any status data for one or more mobile terminals 108a, 108b (e.g., the same type of data as included in the status signal 132. In another example, the instruction signal 128 may include other data related to the communication system 100 including but not limited to communication satellite conditions, jamming areas, jamming intensity, cell configurations, maintenance schedules, and congestion. For example, the instruction signal 128 may include prediction data that a mobile terminal 108a will move from one cell to another at a specific time. In another example, the instruction signal 128 may include a maintenance/reboot schedule for one of the communication satellites 104 of the communication system 100.

The instruction signal 128 may also take the form of a command. For example, the instruction signal 128 may include a command to increase the transmitting power of the signal emitted from the mobile terminal 108a, 108b. In another example, the instruction signal 128 may include a command for the mobile terminal 108a, 108b to change operational parameters in order to receive data from a new cell or communication satellite 104.

In should be understood that the mobile terminal 108a, 108b may be configured to communicate directly to the base terminal 124 without the use of the communication satellite 104. For example, a base terminal 124 within a line-of-sight of a mobile terminal 104a, may be able to direct an instruction signal 128 directly to the mobile terminal 104a. Therefore, the above description should not be interpreted as a limitation of the present disclosure, but merely an illustration.

Figure 2:
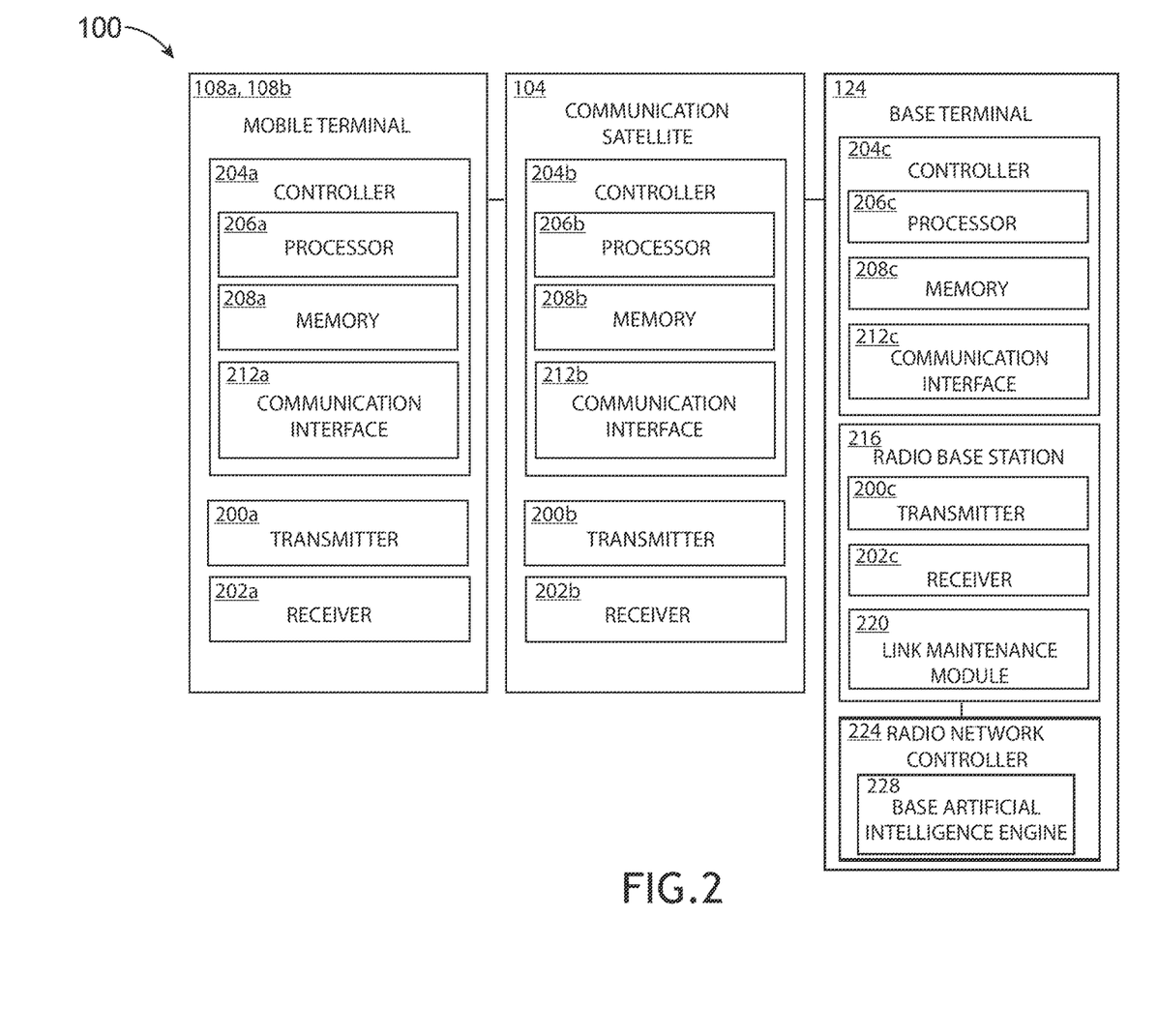
FIG. 2 is a block diagram illustrating the components of the communication system 100 in accordance with one or more embodiments of the disclosure.

FIG. 2 is a block diagram illustrating the components of the communication system 100 in accordance with one or more embodiments of the disclosure. In some embodiments, the mobile terminal 108a, 108b, the base terminal 124, and the communication satellite 104 each contain a transmitter 200a-c (e.g., specifically, a mobile transmitter 200a and a base transmitter 200c) and a receiver 202a-c (e.g., specifically, a mobile receiver 202a and a base receiver 202c) that are each configured to perform the transmission and reception tasks required of the communication system 100. The mobile terminal 108a, 108b, the base terminal 124, and the communication satellite 104 each contain a controller 204a-c being in communication within the mobile terminal 108a, 108b, the base terminal 124, and the communication satellite 104 and configured to receive, process, and transmit data within the mobile terminal 108a, 108b, the base terminal 124, and the communication satellite 104. The controller 204a-c is configured to provide processing functionality for the communication system and includes one or more processors 206a-c configured to perform functions or steps according to program instruction stored in a memory 208a-c. The controller 204a-c is further configured to include a communication interface 212a-c. The communication interface 212a-c is configured to facilitate data transfer between components of the communication system 100 (e.g., the respective mobile terminal 108a, 108b, the base terminal 124, and the communication satellite 104) and/or other componentry.

The one or more processors 206a-c may include any type of processing elements, including but not limited to integrated circuits (e.g., application specific integrated circuits (ASIC)) and field programmable gate arrays (FPGA). The one or more processors 206a-c may separately or collectively perform the functions and/or step as described herein. The memory 208a-c may also include resident or external memory for storing data, executable code, and other resident or external memory generated by the communication system 100. The controller 204a-c can execute one or more software programs embodied in a non-transitory computer readable medium (e.g., memory 208a-c) that implement techniques described herein. In some embodiments, the controller 204a-c is not limited by the materials from which it is formed or the processing mechanisms employed therein and, as such, can be implemented via semiconductor(s) and/or transistors (e.g., using electronic integrated circuit (IC) components), and so forth.

The memory 208a-c can be an example of tangible, computer-readable storage medium that provides storage functionality to store various data and/or program code associated with operation of the communication system 100 and/or controller 204a-c such as software programs and/or code segments, or other data to instruct the controller 204a-c and possibly other components of the communication system 100, to perform the functionality described herein. Thus, memory 208a-c can store data, such as a program of instructions for operating the controller 204a-c and other components of the communication system 100. The memory 208a-c can be integral with the controller 204a-c, can comprise stand-alone memory, or can be a combination of both. Some examples of the memory 208a-c can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 212a-c can be operatively configured to communicate with componentry within the communication system 100 (e.g., the respective mobile terminal 108a, 108b, the base terminal 124, and the communication satellite 104). For example, the communication interface 212a-c may be configured to retrieve data from the controller 204a-c, transmit data for storage in the memory 208a-c, retrieve data from storage in the memory 208a-c, and so forth. The communication interface 212a-c can also be communicatively coupled with the controller 204a-c to facilitate data transfer between components of the communication system 100, and the controller 204a-c.

It should be noted that while the communication interface 212a-c is described as a component of the respective mobile terminal 108a, 108b, the base terminal 124, and the communication satellite 104, one or more components of the communication interface 212a-c may be implemented as external components communicatively coupled to the communication system 100, and other components of the communication system 100 via a wired and/or wireless connection.

In some embodiments, the base terminal 124 contains a radio base station 204 configured to communicate with the communication satellite 104 and/or the mobile terminal 108a, 108b. The radio base station 204 includes the transmitter 200 c, a receiver 202 c, and a link maintenance module 220 configured to convert incoming signals (e.g., the status signal) into digital data (e.g., a byte stream) and convert outgoing data into an instruction signal. The base terminal 124 may further include a radio network controller 224 configured to carry out radio resource management, such as mobility management and direct data streams within the base station. For example, the radio network controller 224 may receive data from the radio base station 216 and forward the data to another component of the base terminal 124. The base terminal 124 may include more than one radio network controller that is registered with one or more mobile terminals 108a, 108b or one or more communication satellites 104a, 104b. For example, if communicating mobile terminals 108b, 108b were registered to use different radio network controllers 224 and different communication satellites 104a, 104b, messaging and data would flow between the separate radio network controllers 224 within the base terminal 124.

In embodiments, the base terminal 124 further includes a base artificial intelligence engine 228 configured to prepare instruction data based on status data and other data received within the communication system 100. The base artificial intelligence engine 228 may be configured as a module within the base terminal 124 or as a standalone module that communicated with components of the base terminal 124 (e.g., the radio network controller). For example, the base artificial intelligence engine 228 may include or be in communication with the satellites controller 204c, and therefore being in communication with the base terminal 124 and/or the communication system 100, with the controller 204c including the one or more processors 206c configured to perform functions or steps according to program instructions stored in the memory 208c (i.e., the instructions causing the one or more processors to perform the functions of steps), and the communication interface 212c configured to facilitate data transfer between components of the base artificial intelligence engine 228 and/or other componentry within the base terminal 124 and/or the communication system 100. The base artificial intelligence engine 228 may be enclosed and/or incorporated within the base terminal 124. For example, the one or more processors 206c within the base terminal 124 may perform the functions and steps of the base artificial intelligence engine 228. The base artificial intelligence engine 228 may also be partially enclosed and/or incorporated within the base terminal 124. For example, one or more functions or steps performed by the base artificial intelligence engine 228 may be executed by the one or more processors 206c of the base terminal 124, with one or more functions or steps executed outside of the base terminal. Any combination of componentry may be used for incorporating the functions of the base artificial intelligence engine 228 with the base terminal 124 and/or the communication system 100. Therefore, the above description should not be interpreted as a limitation of the present disclosure, but merely an illustration.

The base artificial intelligence engine 228 may utilize any type of artificial intelligence model including but not limited to reactive machine learning and limited memory learning. For example, the base artificial intelligence engine 228 may utilize limited memory learning that includes machine learning and/or the development of machine learning models and decision algorithms. For instance, the artificial intelligence engine 228 may utilize receive status data and historical data (e.g., previous status data) and apply decision algorithms to the data to determine what action should be taken on the current state of the mobile terminal 108a, 108b and/or the communication system 100. In another instance, the artificial intelligence engine 228 may receive status data and/or historical and modify the decision algorithm based on the status data and/or historical data, then apply the decision algorithm to status data or future status data. In another example, the artificial intelligence engine is further configured to apply a machine learning model to analyze the status data.

Figure 3:
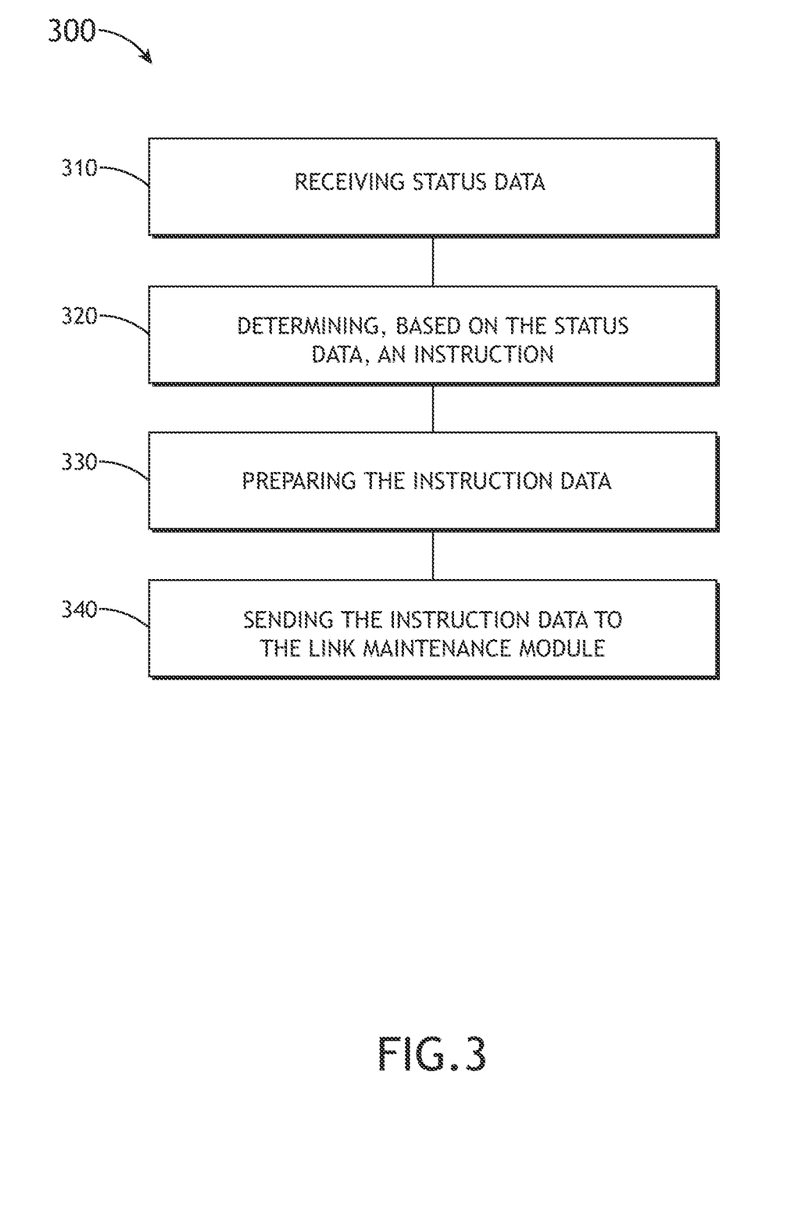
FIG. 3 is a flow chart illustrating a method for preparing and sending an instruction signal from a base terminal using artificial intelligence, in accordance with one or more embodiments of this disclosure.

FIG. 3 is a flow chart illustrating a method 300 for preparing and sending an instruction signal from a base terminal using artificial intelligence, in accordance with one or more embodiments of this disclosure. In some embodiments, the method 300 includes a step 310 of receiving status data. For example, the base terminal 124 may receive a status signal 132 from the mobile terminal 108a, 108b (e.g., containing uplink interference data), which is converted into status data that is sent to the artificial intelligence engine 228 via the radio network controller 224. The artificial intelligence engine 228 may also receive other data (e.g., historical data, communication satellite data, communication system data, environmental data, weather data).

In one or more embodiments, the method includes a step 320 of determining, based on the status data, an instruction. For example, the artificial intelligence engine 228 may apply a decision algorithm to the status data and/or other data and determine an instruction based on the status data and/or other data. For instance, the artificial intelligence engine 228 may receive uplink interference data from the mobile terminal 108a, 108b and historical uplink interference data and determine via the decision algorithm an instruction that the power level of the transmitter should be increased more than what would be normally raised than by looking only at the current status data.

In one or more embodiments, the method 300 includes a step 330 of preparing the instruction data. For example, the instruction is prepared as instruction data that may be readily converted into an analog form via the link maintenance module 220 and transmitted via the transmitter. In one or more embodiments, the method includes a step 340 of sending the instruction data to the link maintenance module 220. For example, the decision algorithm notifies the messaging protocol in the radio network controller to send the instruction data to either the mobile terminal 108a, 108b, the communication satellite 104, or other entity within the communication system 100. The radio network controller 224 then notifies the radio base station 216 of a message to send out, and the radio base station forwards the message via RF to the mobile terminal 108a, 108b. The base terminal 124 may broadcast system information block (SIB) messages every few seconds the mobile terminal 108a, 108b. The SIB messages may contain information about the state of the communication system 100 such as congestion.

Figure 4:
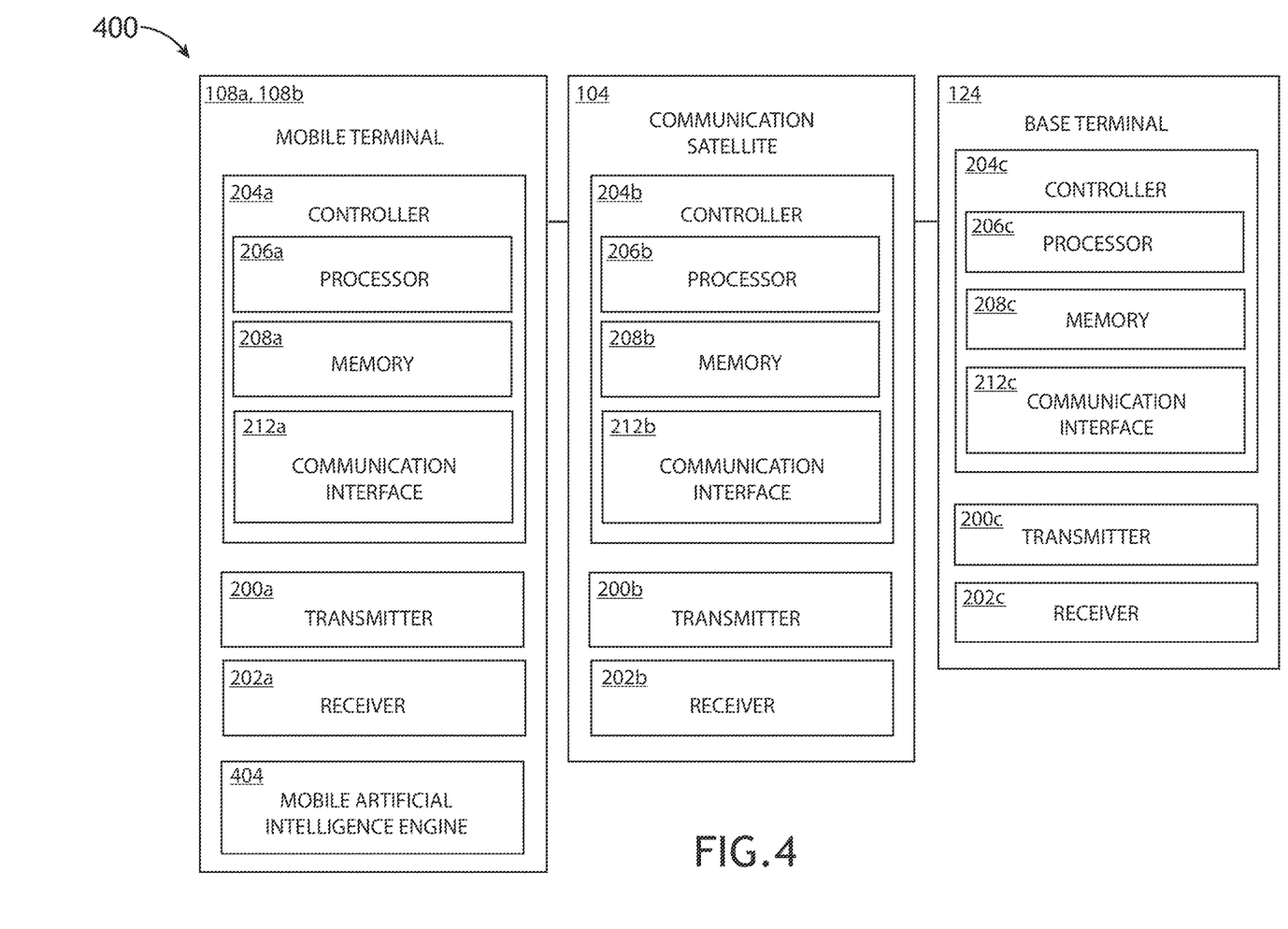
FIG. 4 is a block diagram illustrating the components of the communication system, in accordance with one or more embodiments of the disclosure.

FIG. 4 is a block diagram illustrating the components of the communication system 400, in accordance with one or more embodiments of the disclosure. Communication system 400 may include one or more, or all of the components of communication system 100 and vice versa.

In some embodiments of the communication system 400, the mobile terminal 108a, 108b further includes a mobile artificial intelligence engine 404. The base terminal 124 of the communication system 400 may or may not have a base artificial intelligence engine 228. The mobile artificial engine 404 may have some or all components and/or characteristics of the base artificial intelligence engine 228 and is capable of executing decision algorithms specific to the tasks of the mobile terminal 108a, 108b. The mobile terminal 108a, 108 may further include one or more processors specific to a specific waveform. For example, the mobile terminal 108a, 108b may include a black waveform processor.

Figure 5:
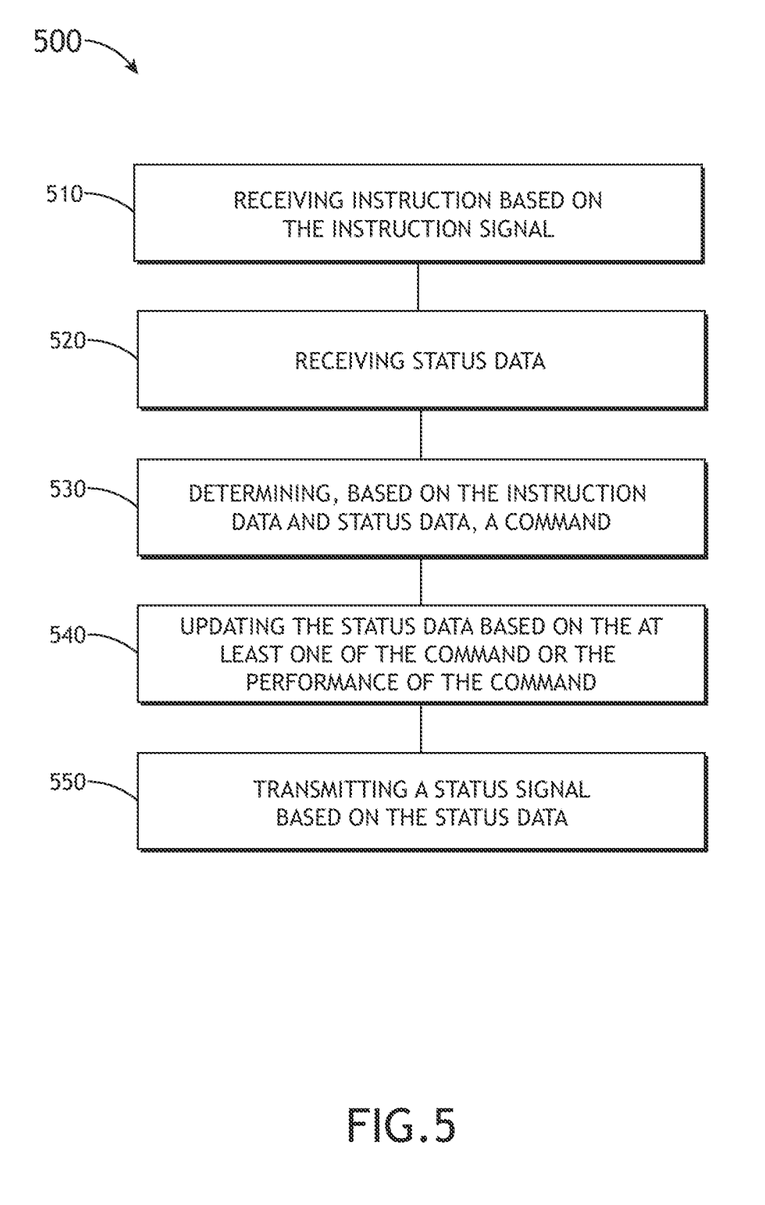
FIG. 5 a flow chart illustrating a method for determining a command, in accordance with one or more embodiments of this disclosure.

FIG. 5 a flow chart illustrating a method 500 for determining a command, in accordance with one or more embodiments of this disclosure. In some embodiments, the method includes a step 510 of receiving instruction data based on the instruction signal. For example, the mobile terminal 108a, 108b may receive an instruction signal 128 from the base terminal 124 via the receiver 202a. Components within the mobile terminal 108a. 108b (e.g., one or more processors 208a) convert the instruction signal 128 into instruction data that may be utilized by the mobile artificial intelligence engine 404.

In embodiments, the method 500 further includes a step 520 of receiving status data. The status data may include any available data available to the mobile terminal 108a, 108b. Step 520 may further include receiving historical data.

In embodiments, the method further includes a step 530 of determining, based on the instruction data and status data, a command. For example, the mobile artificial intelligence engine 404 may receive instruction data instructing the mobile terminal 108a, 108b to decrease transmission power, and status data indicating that a decrease in transmission power may be warranted. However, the mobile artificial intelligence engine, configured with a machine learning model based on historical data, may determine that due to the one or more parameters of the communication system 100, the lessening of transmission power is not warranted, and a command is then generated by the mobile artificial intelligence engine 404 to instruct the mobile terminal 108a, 108b not to decrease transmission power.

In embodiments, the method 500 include a step 540 of updating the status data based on at least one of the command or the performance of the command. For example, if the command to increase transmission power is determined, and the transmission power of the mobile terminal 108a, 108b is subsequently raised, the status data will be updated. In another example, if the command to increase transmission power is determined, the status data will be updated to include the anticipated increase in transmission power.

In some embodiments, the method 500 includes the step 550 of transmitting a status signal based on the status data. For example, processors 206a within the mobile terminal 108a, 108b may convert the updated status data to a status signal 128 that is then transmitted via the 200a to the base terminal 124 via the relay function of the communication satellite 104.

Figure 6:
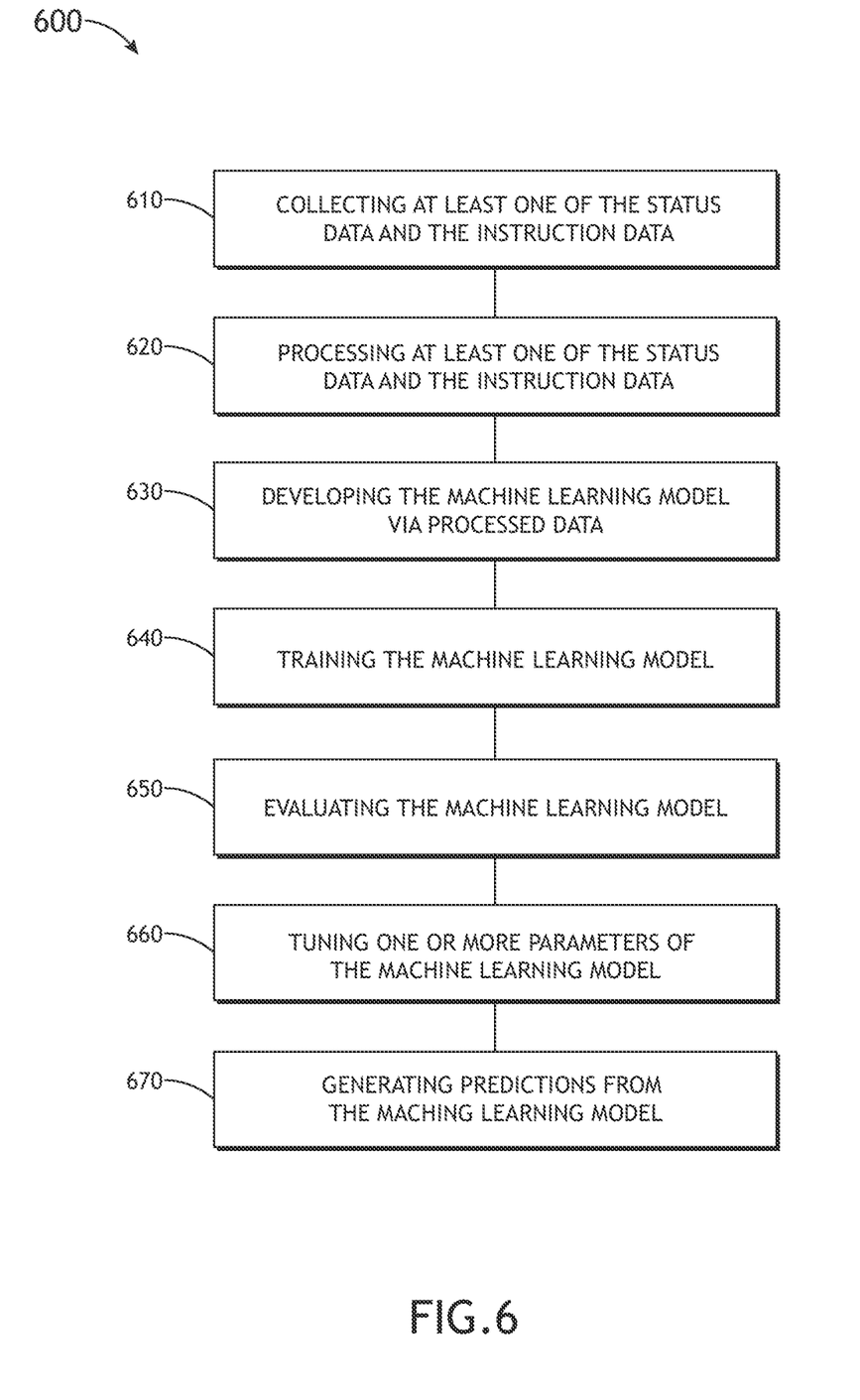
FIG. 6 is a flowchart illustrating a method for generating the base artificial intelligence engine 228 and/or the mobile artificial intelligence engine 404, in accordance with one or more embodiments of the disclosure.

In some embodiments, the base artificial intelligence engine 228 and/or the mobile artificial intelligence engine 404 is configured to generate and/or train the machine learning model. FIG. 6 is a flowchart illustrating a method for generating the base artificial intelligence engine 228 and/or the mobile artificial intelligence engine 404, in accordance with one or more embodiments of the disclosure.

In some embodiments, the method 600 includes a step 610 of collecting at least one of the status data and the instruction data. For example, the base artificial intelligence engine 228 may receive status data from the mobile terminal 108a, 108b. In another example, the mobile artificial intelligence engine 404 may receive instruction data from the base terminal 124. The base artificial intelligence engine 228 and/or the mobile artificial intelligence engine 404 may also receive historical data. For example, the base artificial intelligence engine 228 and/or the mobile artificial intelligence engine 404 may also receive historical data from a database (e.g., located in a server or other memory-containing device) that is communicatively coupled to the communication system 100. The database may also include the status data and/or the instruction data.

In some embodiments, the method 600 includes a step 620 of processing at least one of the status data and the instruction data. For example, the status data may need to be checked for errors and have biases removed. For instance, several sets of status data collected over time (e.g., historical data) may need to be processed to ensure that the collected data is not skewed towards collection at specific times or geographical locations. In another example, the instructional data may be normalized, or further prepared to downstream calculations. For instance, several sets of instructional collected over time (e.g., historical data) may need to be curated to for proper file formatting and syntax as the data is further processed.

In some embodiments, the method 600 includes a step 630 of developing the machine learning model via the processed data. Any machine learning model may be developed using any type of learning algorithms including but not limited to linear regression, logistic regression, decision trees, K-means, principal component analysis (PCA), Support Vector Machines (SVM), Naïve Bayes, Random Forest and Neural Networks.

In some embodiments, the method 600 includes a step 640 of training the machine learning model. For example, status data, instruction data, and/or historical data obtained from the one or more components of the communication system 100 may be used to improve the predictions of the machine learning model. For instance, characteristics or inputs of the historical may be weighted and/or biased in an iterative process, with the goal of the accuracy of the machine learning model increasing after each iteration or cycle.

In some embodiments, the method 600 includes a step 650 of evaluating the machine learning model. For example, the machine learning model may be tested against a control dataset. For instance, the control dataset may include a predetermined set of operational data, status data, instruction data, or other data obtained from the communication system 100. In another instance, the control dataset may include new operational data, status data, instruction data, or other data obtained from the communication system 100.

In some embodiments, the method 600 includes a step 660 of tuning one or more parameters of the machine learning model. Tuning the one or more parameters of the machine learning model (e.g., over one or more cycles) may increase the accuracy of the machine learning model. A threshold for how many cycles of parameter tuning is performed may bet set based on the accuracy of the machine learning model.

In some embodiments, the method 600 includes a step 670 of generating predictions based on the machine learning model. For example, the base artificial intelligence engine 404, employing the machine learning model, may be queried on whether uplink interference will increase at a specific time at a specific location for the mobile terminal 108a, 108b. An instruction signal 128 may then be generated based on an output from the base artificial intelligence engine 404. In another example, the mobile artificial intelligence engine 228, employing the machine learning model, may be queried on whether to continue service in a contested RF environment. A command and/or a status signal may then be generated based on an output from the mobile artificial intelligence engine 404. The artificial intelligence engine may be queried on a regular basis (e.g., every minute) or conditions warrant a query (e.g., upon the detection of an adversary).

For a base terminal 124 that includes a base artificial intelligence engine 228, the initial model for training by the base artificial intelligence engine 228 would not be platform specific. In some cases, the base artificial intelligence engine 228 would receive data in the form of RF or waveform characteristics (e.g., link interference, transmit power, network congestion) over different times, different cells, and in different network configurations. The base terminal 124 may also determine information about approximate locations of the mobile terminal 108a, 108b based on beam measurements. The mobile terminal 108a, 108b may also report position, velocity, acceleration, and other data to the base terminal 124.

For a mobile terminal 108a, 108b that includes a mobile artificial intelligence model 494, the initial model for training by the mobile artificial intelligence engine 404 may be platform specific. For example, the training model may be tailored based on the training set to favor particular outcomes. For instance, the training model may be trained to determine whether to determine continuing service in a contested RF environment because the RF processing software is sufficiently sensitive. In another instance, the training model may be trained to determine when to initiate the mobility process sooner when network characteristics begin showing signs of deterioration so as not to completely drop services. In another instance, if the mobile terminal 108a, 108b tends to lose network sync at a higher level than what normally triggers mobility, the training model may be trained to determine if and when to adjust mobility threshold for the mobile terminal 108a, 108b, preventing the mobile terminal 108a, 108b from going out of service. In another instance, if the mobile artificial intelligence engine 404 determines that the mobile terminal 108a, 108b is delayed in initiating mobility attempts when signal quality is poor in certain environment or hardware, then the training model will be trained to more quickly trigger mobility scenarios. In another instance, if the mobile artificial intelligence engine 404 determines that the mobile terminal 108a, 108b will join a group provisioned on a particular cell, a command based on an output from the mobile terminal mobile artificial intelligence engine 404 may instruct the mobile terminal 108a, 108b to move to that cell immediately rather than wait until the group join attempt happens automatically via existing waveform functionality. For instance, within MUOS, a mobile terminal 108a, 108b on board a military vehicle utilizing the mobile artificial intelligence engine 404 may be instructed to move to a specific cell immediately rather than waiting for the group join attempt to occur. In another example, the artificial intelligence engine 404 may instruct the mobile terminal 108a, 108b to postpone a change in operational parameters.

In some embodiments, the mobile terminal 108a, 108b and/or the base terminal 124 further includes a disengagement control configured to disengage the base artificial intelligence engine 228 and/or the mobile artificial intelligence engine 404. For example, the mobile terminal 108a, 108b may disengage the mobile intelligence engine 228 via the disengagement control during normal conditions (e.g., non-adversarial conditions).

In some embodiments, the base artificial intelligence engine 228 and/or the mobile artificial intelligence engine 404 receive information from outside of the communication system 100. For example, the mobile artificial intelligence engine 404 may receive navigation data from a vehicle coupled to the mobile terminal 108a, 108b. In another example, the base terminal 124 may receive meteorological data from a meteorological database outside of the communication system.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A communication system comprising:
 a mobile terminal comprising: a mobile transmitter; and a mobile receiver; and
 a base terminal comprising: a radio base station comprising: a base receiver configured to receive a status signal from the mobile terminal;
 a link maintenance module configured to convert the status signal into status data and convert instruction data into an instruction signal; and
 a base transmitter configured to transmit the instruction signal to the mobile terminal; and
 a radio network controller configured to generate the instruction signal comprising: one or more processors; and a memory coupled to the one or more processors and having instructions stored upon; and
 a base artificial intelligence engine in communication with the one or more processors and the memory, wherein the artificial intelligence engine is configured to:
  receive the status data;
  determine an instruction based on the status data;
  prepare the instruction data;
  send the instruction data to the link maintenance module;
  training a machine learning model;

evaluating the machine learning model; and
tuning one or more parameters of the machine learning model.

2. The communication system of claim 1, wherein the base artificial intelligence engine is further configured to apply a machine learning model to analyze the status data.

3. The communication system of claim 2, wherein the base artificial intelligence engine is further configured to generate the machine learning model, comprising:
collecting the status data;
processing the status data;
developing the machine learning model via the processed data;
training the machine learning model;
evaluating the machine learning model; and
tuning one or more parameters of the machine learning model.

4. The communication system of claim 1, wherein at least one of the mobile terminal or the base terminal is configured to communicate with a satellite.

5. The communication system of claim 4, wherein the satellite is configured as a Mobile User Objective System (MUOS) satellite.

6. The communication system of claim 4, wherein at least one of the status signal or the instruction signal is relayed via the satellite.

7. The communication system of claim 1, further comprising a disengagement control configured to disengage the base artificial intelligence engine.

8. A communication system comprising:
a base terminal comprising: a base receiver; and a base transmitter; and
a mobile terminal comprising: a mobile receiver configured to receive an instruction signal from the base terminal;
one or more processors;
a memory coupled to the one or more processors and having instructions stored upon;
a mobile artificial intelligence engine in communication with the one or more processors and the memory, wherein the mobile artificial intelligence engine is configured to:
receive instruction data based on the instruction signal;
receive status data;
determine a command based on the instruction data and the status data;
update the status data based on the at least the command or a performance of the command;
training a machine learning model;
evaluating the machine learning model; and
tuning one or more parameters of the machine learning model; and
a mobile transmitter configured to transmit a status signal to the base terminal based on the updated status data.

9. The communication system of claim 8, wherein the mobile artificial intelligence engine is further configured to apply a machine learning model to analyze the status data and the instruction data.

10. The communication system of claim 9, wherein the mobile artificial intelligence engine is further configured to generate the machine learning model, comprising:
collecting at least one of the status data and the instruction data;
processing at least one of the status data and the instruction data;
developing the machine learning model via the processed data;
training the machine learning model;
evaluating the machine learning model; and
tuning one or more parameters of the machine learning model.

11. The communication system of claim 8, wherein at least one of the mobile terminal or the base terminal is configured to communicate with a satellite.

12. The communication system of claim 11, wherein the satellite is configured as a Mobile User Objective System (MUOS) satellite.

13. The communication system of claim 11, wherein at least one of the status signal or the instruction signal is relayed via the satellite.

14. The communication system of claim 8, further comprising a disengagement control configured to disengage the mobile artificial intelligence engine.

15. The communication system of claim 8, wherein the command includes at least one of adjusting a mobility threshold, triggering a mobility, adjusting data rates, or postpone a change in operational parameters.

* * * * *